US012466177B2

(12) United States Patent
Ai et al.

(10) Patent No.: US 12,466,177 B2
(45) Date of Patent: Nov. 11, 2025

(54) SIDE HOLDING STRUCTURE AND THERMAL TRANSFER PRINTING DEVICE

(71) Applicant: HUNAN SIJIU TECHNOLOGY CO., LTD, Changsha (CN)

(72) Inventors: Min Ai, Changsha (CN); Wenxiong Huang, Changsha (CN)

(73) Assignee: HUNAN SIJIU TECHNOLOGY CO., LTD, Changsha (CN)

( * ) Notice: Subject to any disclaimer, the term of this patent is extended or adjusted under 35 U.S.C. 154(b) by 0 days.

(21) Appl. No.: 18/751,242

(22) Filed: Jun. 22, 2024

(65) Prior Publication Data

US 2024/0343035 A1 Oct. 17, 2024

Related U.S. Application Data

(63) Continuation of application No. PCT/CN2023/093072, filed on May 9, 2023.

(30) Foreign Application Priority Data

May 11, 2022 (CN) ......................... 202221124127.0

(51) Int. Cl.
*B41F 16/00* (2006.01)
*B41F 1/54* (2006.01)

(52) U.S. Cl.
CPC ................ *B41F 1/54* (2013.01); *B41F 16/00* (2013.01)

(58) Field of Classification Search
USPC ................................................ D15/122, 146
See application file for complete search history.

(56) References Cited

U.S. PATENT DOCUMENTS

| | | | | |
|---|---|---|---|---|
| D952,009 S * | 5/2022 | Ai | .................................. | D32/70 |
| 2023/0354946 A1* | 11/2023 | Barney | ................... | B41F 16/02 |

FOREIGN PATENT DOCUMENTS

| | | | |
|---|---|---|---|
| CN | 109642392 A * | 4/2019 | ............. D06C 15/10 |
| CN | 214522682 U | 10/2021 | |
| CN | 214606504 U | 11/2021 | |
| CN | 214821768 U | 11/2021 | |
| CN | 217574438 U | 10/2022 | |
| WO | 2021034687 A1 | 2/2021 | |

* cited by examiner

*Primary Examiner* — Leslie J Evanisko
(74) *Attorney, Agent, or Firm* — Birchwood IP

(57) ABSTRACT

A side holding structure is provided, which includes side openings arranged on opposite sides of a housing, a plurality of snap joints are arranged on edges of the side openings; holding covers assembled in the side openings, a plurality of hooks detachably connected to the plurality of snap joints are arranged on an inner side of a ring mouth portion, at least one positioning groove is arranged on a top outside of a cover wall; and at least one inserting portion arranged on a top cover of the housing and fitted to the positioning groove. A thermal transfer printing device using the side holding structure described above is further provided.

10 Claims, 5 Drawing Sheets

SIDE HOLDING STRUCTURE AND THERMAL TRANSFER PRINTING DEVICE

CROSS-REFERENCE TO RELATED APPLICATIONS

This application is a continuation of co-pending International Patent Application No. PCT/CN2023/093072, filed on May 9, 2023, which claims the priority and benefit of Chinese patent application number 202221124127.0, filed on May 11, 2022 with China National Intellectual Property Administration, the entire contents of which are incorporated herein by reference.

TECHNICAL FIELD

The present invention relates to the field of thermal transfer printing technology, and particularly, to a side holding structure and a thermal transfer printing device.

BACKGROUND

A thermal transfer printing device is to laminate layers and thermosets on transfer paper to printing stock under pressure using heat generated by hot plate assembly. The working principle is that it transfers patterns, text, etc. on transfer paper to printing materials by using heat generated by hot plate assembly under a certain pressure, temperature, and time.

The thermal transfer printing device provided in the present invention is a manual force type, and the pressure required for thermal transfer printing is applied by the user. Previous thermal transfer printing devices, such as the solution disclosed in CN109642392A, featured a handle arranged on the upper side of the main body. The user applied pressure to the main body through the handle with both hands, so the force-applying structure was affected by main body volume, leading to poor space and comfort when holding with hands, affecting the use experience and thermal transfer printing effect. Therefore, the manufacturer has designed a side holding scheme where holding grooves are arranged on the opposite sides of the main body for comfortable holding and easy force applying. Holding grooves are formed on a cover. Openings are arranged on the opposite sides of the main body for holding grip grooves. The cover is connected by snap joints, and is easily pulled out due to deformation when force is applied.

SUMMARY

The purpose of the present invention is to solve complex assembly connection of the existing side holding groove cover and poor firmness by arranging snap-on structures in holding covers and side openings, and designing inserting and positioning structures between the holding covers and top cover.

The side holding structure comprises the side openings arranged on the opposite sides of the housing of the thermal transfer printing device, wherein a plurality of snap joints are arranged on the edge of the side openings; the holding covers assembled in the side openings, wherein the holding cover comprises a ring mouth portion and a cover wall of the holding groove that is connected to the rear side of the ring mouth portion and concave inward, a plurality of hooks detachably connected to the plurality of snap joints are arranged on the inner side of the ring mouth portion, at least one positioning groove is arranged on the top outside of the cover wall; and at least one inserting portion arranged on the top cover of the top side of the housing and fitted to the positioning groove.

Compared with the prior art, the holding covers of the side holding structure provided in the present invention are detachably connected to the side openings through the snap-on structures, featuring a fast and convenient assembly. The holding covers are firmly connected to the top cover through the inserting and positioning structures between them, and will not be deformed and pulled out when force is applied.

Preferably, the step portion is arranged on the outer ring edge of the side opening, the ring mouth portion is fitted to the step portion, and the hook avoidance opening is arranged on the step portion. The step portion can hold the ring mouth portion, exhibiting a better appearance, and the avoidance opening can avoid the position of the hooks.

Preferably, to improve the positioning effect, the underside of the positioning groove and the inserting portion are designed to uptilt along the inner side from the opening. This arrangement facilitates the user to place hands in.

Preferably, the lines structure is arranged on the inner surface of the cover wall. This arrangement increases the friction between the hands and the cover wall.

Preferably, the top cover is detachably connected to the top side of the housing by snap-on structures. The use of this connection structure can avoid a connection hole structure via screwed connection, providing the product with better integrity and appearance.

The thermal transfer printing device comprises the base frame, the housing, the holding covers, wherein the top cover and the hot plate assembly are arranged on the base frame, the side openings are arranged on the opposite sides, and a plurality of snap joints are arranged on the edge of the side openings; the holding cover comprises the ring mouth portion and the cover wall of the holding groove that is connected to the rear side of the ring mouth portion and concave inward, a plurality of hooks detachably connected to the plurality of snap joints are arranged on the inner side of the ring mouth portion, at least one positioning groove is arranged on the top outside of the cover wall; the top cover is detachably connected to the top side of the housing, at least one inserting portion fitted to the positioning groove is arranged on the edge, and the inserting mouth for the inserting portion to pass through is arranged on the top side of the housing; heat required for thermal transfer printing is generated from the underside of the hot plate assembly when energized.

Preferably, the cover ring is mounted on the upper end of the housing, and the sinking platform holding the top cover is arranged on the inner edge of the cover ring. The use of the above structure achieves more tight connection, better appearance, and more flexible shape.

Preferably, the top cover is detachably connected to the housing by snap-on structures.

Preferably, the concave area is arranged in the middle part of the housing, the handle bases connected on its both ends are arranged in the concave area, the avoidance opening relative to the concave area, and the handle top covering the upper side of the handle base are arranged in the middle part of the top cover; the snap-on structures comprise the first snap-on structure arranged between the edge of the top cover and the top edge of the housing, the second snap-on structure between the edge of the avoidance opening and that of the concave area, and the third snap-on structure between the top of the handle and the handle base. Due to the adoption of the above structure, the user can apply force as required through the top handle or the side holding structure. The top cover is more tightly and stably connected to the housing by the first, second and third snap-on structures.

DESCRIPTION OF EMBODIMENTS

Embodiment 1

Figure 1:
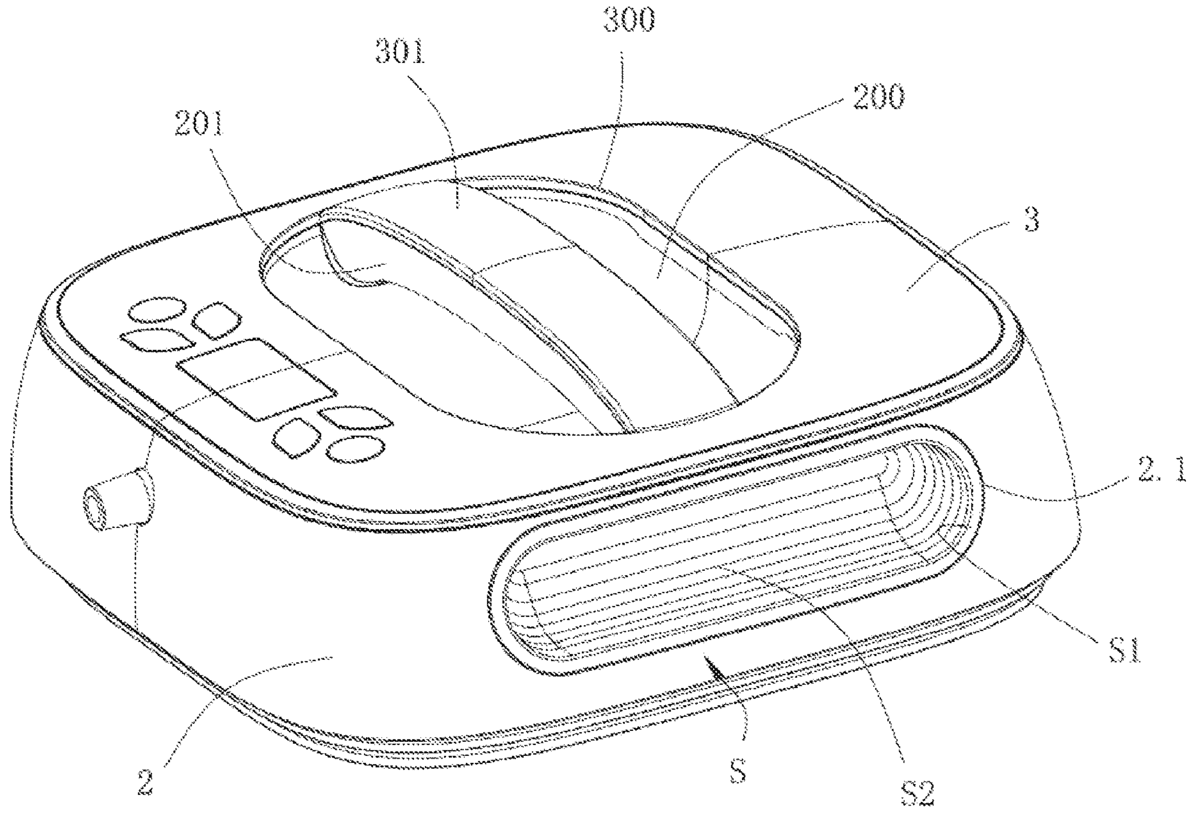
FIG. 1 is a three-dimensional diagram of the thermal transfer printing device of the present invention.
Figure 2:
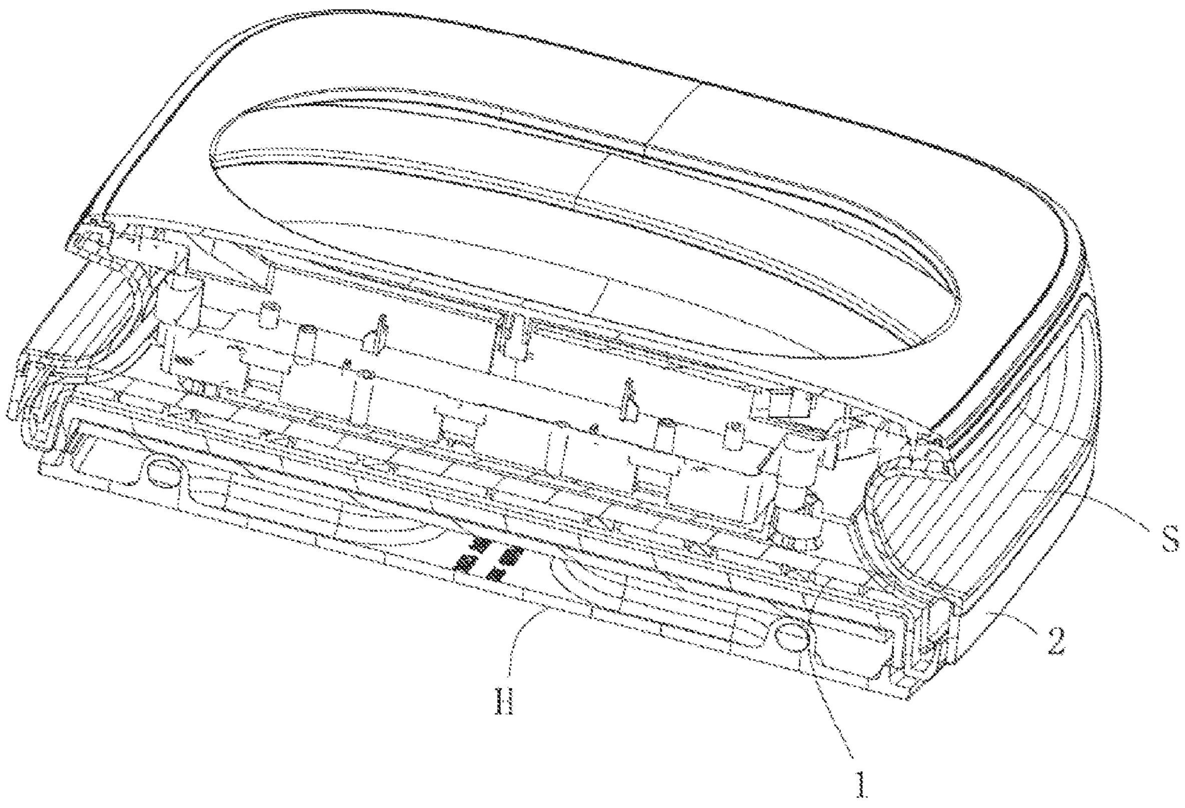
FIG. 2 is a three-dimensional cross-sectional view of the thermal transfer printing device of the present invention.
Figure 3:
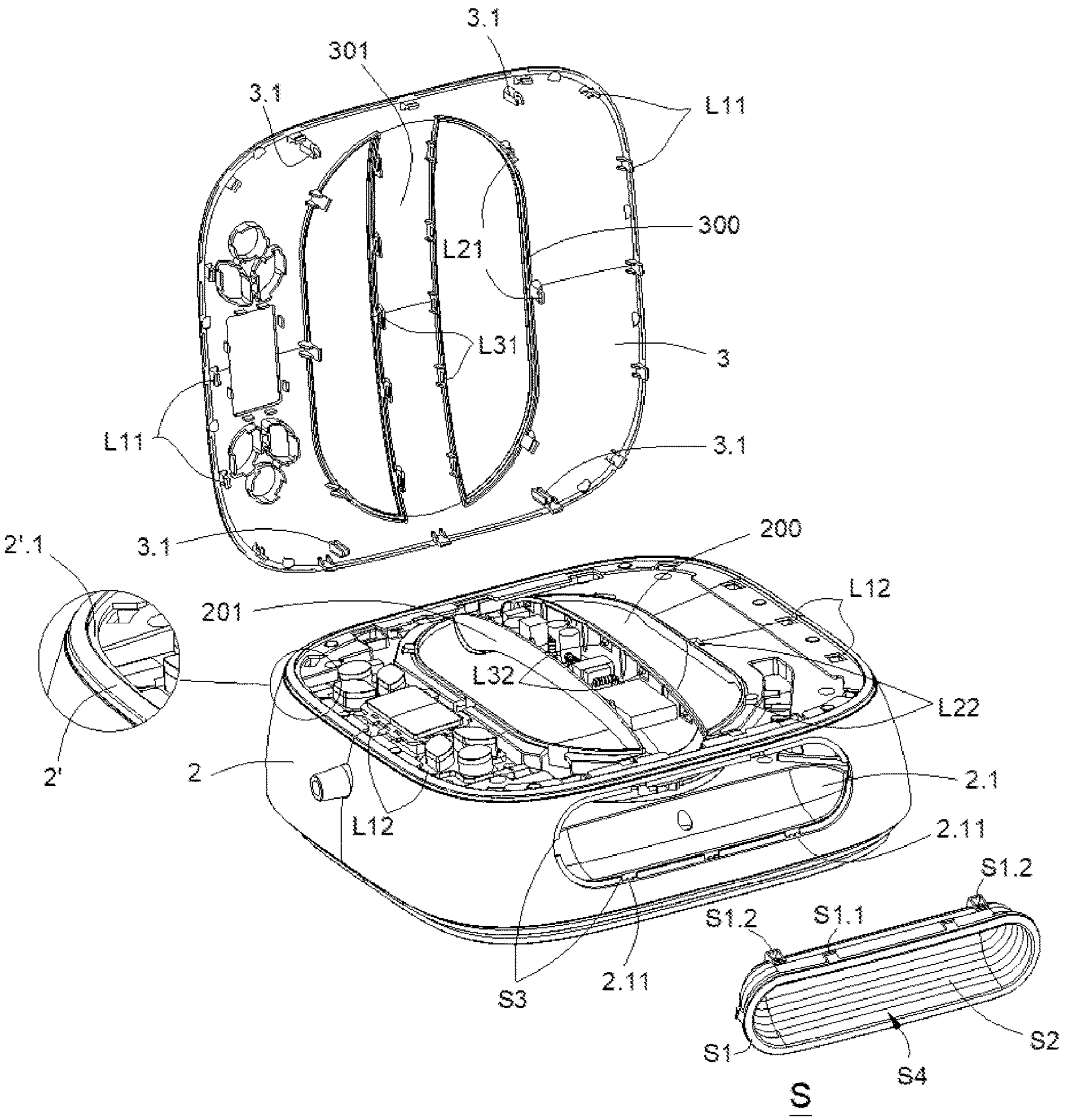
FIG. 3 is an exploded view (I) of the thermal transfer printing device of the present invention.
Figure 4:
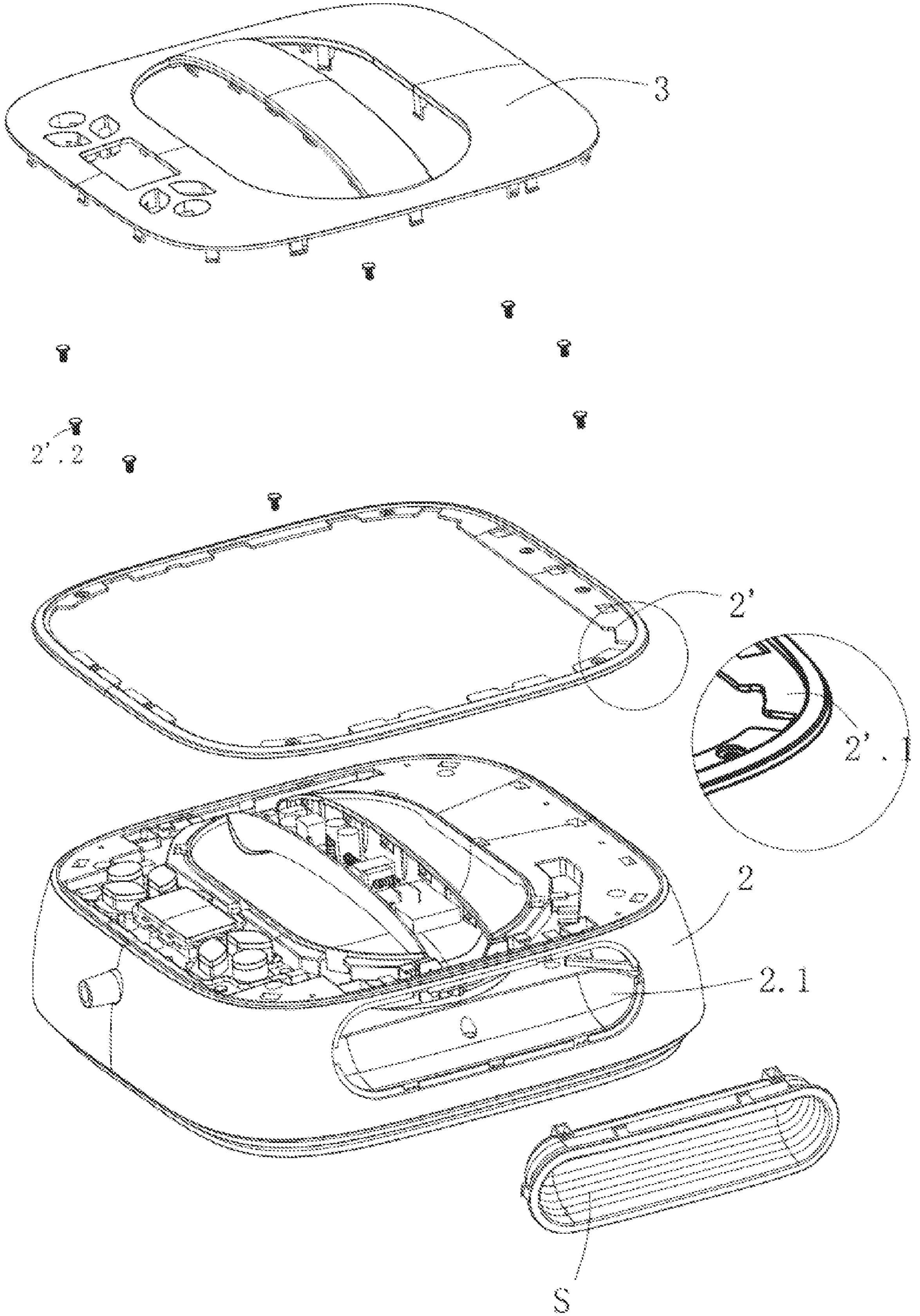
FIG. 4 is an exploded view (II) of the thermal transfer printing device of the present invention.
Figure 5:
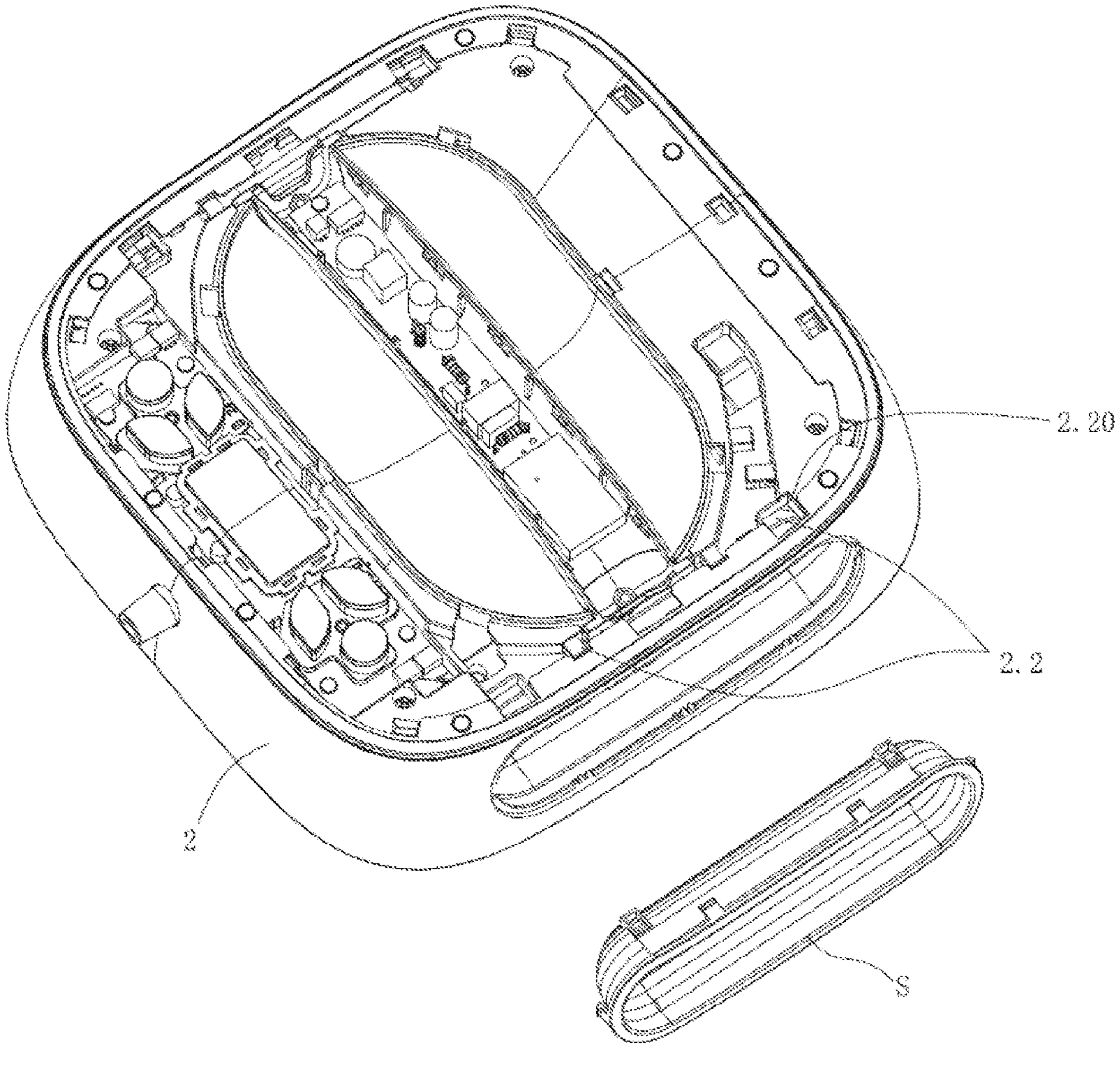
FIG. 5 is a partial exploded view of the thermal transfer printing device of the present invention (excluding the top cover).

Referring to FIGS. 1 to 5, the thermal transfer printing device provided in this embodiment comprises: base frame 1, housing 2, holding cover S, top cover 3, and hot plate assembly H. The side holding structure comprises: the side openings 2.1 arranged on the opposite sides of the housing 2 of the thermal transfer printing device, wherein a plurality of snap joints 2.11 are arranged on the edge of the side openings 2.1; the holding covers S assembled in the side openings 2.1, wherein the holding cover S comprises the ring mouth portion S1 and the cover wall S2 of the holding groove that is connected to the rear side of the ring mouth portion S1 and concave inward, a plurality of hooks S1.1 detachably connected to the plurality of snap joints 2.11 are arranged on the inner side of the ring mouth portion S1, at least one positioning groove S1.2 is arranged on the top outside of the cover wall S2; and at least one inserting portion 3.1 arranged on the top cover 3 of the top side of the housing 2 and fitted to the positioning groove S1.2, wherein the inserting mouth 2.20 for the inserting portion 3.1 to pass through is arranged on the top side of the housing 2, and the inserting portion 3.1 is detachably inserted into the positioning groove S1.2 through the inserting mouth 2.20. The step portion is arranged on the outer ring edge of the side opening 2.1, the ring mouth portion S1 is fitted to the step portion, and the hook S1.1 avoidance opening S3 is arranged on the step portion. The step portion can hold the ring mouth portion, exhibiting a better appearance, and the avoidance opening can avoid the position of the hooks.

Compared with the prior art, the holding covers S of the side holding structure provided in the present invention are detachably connected to the side openings 2.1 through the snap-on structures, featuring a fast and convenient assembly. The holding covers S are firmly connected to the top cover 3 through the inserting and positioning structures between them, and will not be deformed and pulled out when force is applied. The user can pull out the holding covers S through the inserting mouth 2.20 using a tool.

In one embodiment, to improve the positioning effect, more than two sets of positioning grooves S1.2 and inserting portions 3.1 are arranged. In this embodiment, two sets of positioning grooves S1.2 and inserting portions 3.1 are arranged.

In one embodiment, the underside of the cover wall S2 is designed to uptilt along the inner side from the opening. This arrangement facilitates the user to place hands in.

In one embodiment, the lines structure S4 is arranged on the inner surface of the cover wall S2. This arrangement increases the friction between the hands and the cover wall.

In one embodiment, the top cover 3 is detachably connected to the top side of the housing 2 by snap-on structures. The use of this connection structure can avoid a connection hole structure via screwed connection, providing the product with better integrity and appearance.

Embodiment 2

Referring to FIGS. 1 to 5, the thermal transfer printing device comprises: base frame 1, housing 2, holding cover S, top cover 3, and hot plate assembly H; the housing 2 is mounted on the base frame 1, the side openings 2.1 are arranged on the opposite sides, wherein a plurality of snap joints 2.11 are arranged on the edge of the side openings 2.1; the holding cover S comprises the ring mouth portion S1 and the cover wall S2 of the holding groove that is connected to the rear side of the ring mouth portion S1 and concave inward, a plurality of hooks S1.1 detachably connected to the plurality of snap joints 2.11 are arranged on the inner side of the ring mouth portion S1, at least one positioning groove S1.2 is arranged on the top outside of the cover wall S2.

The top cover 3 is detachably connected to the top side of the housing 2, at least one inserting portion 3.1 fitted to the positioning groove S1.2 is arranged on the edge, the inserting mouth 2.20 for the inserting portion 3.1 to pass through is arranged on the top side of the housing 2, and the inserting portion 3.1 is detachably inserted into the positioning groove S1.2 through the inserting mouth 2.20; the hot plate assembly H is mounted on the underside of the base frame 1, and generates heat required for thermal transfer printing when energized.

The avoidance hole 2.2 is arranged on the upper end of the housing 2 relative to the positioning groove S1.2.

The cover ring 2' is arranged on the upper end of the housing 2, and the sinking platform 2'.1 holding the top cover 3 is arranged on the inner edge of the cover ring 2'. The use of the above structure achieves more tight connection, better appearance, and more flexible shape. The cover ring 2' is fixed to the upper end of the housing 2 by the screw 2'.2.

In one embodiment, the top cover 3 is detachably connected to the housing 2 by snap-on structures. Specifically, the concave area 200 is arranged in the middle part of the housing 2, the handle bases 201 connected on its both ends are arranged in the concave area 200, the avoidance opening 300 relative to the concave area 200, and the handle top 301 covering the upper side of the handle base 201 are arranged in the middle part of the top cover 3; the snap-on structures comprise the first snap-on structure (L11, L12) arranged between the edge of the top cover 3 and the top edge of the housing 2, the second snap-on structure (L21, L22) between the edge of the avoidance opening 300 and that of the concave area 200, and the third snap-on structure (L31, L32) between the top of the handle 301 and the handle base 201. With the above structure, the user can apply force as required through the top handle or the side holding structure. The top cover 3 is more tightly and stably connected to the housing 2 by the first snap-on structure (L11, L12), the second snap-on structure (L21, L22) and third snap-on structure (L31, L32).

According to the disclosure and instructions of the above specification, the technical personnel in the field to which the present invention belongs may change and modify the above embodiments. The present invention is not limited to the specific embodiments disclosed and described above.

Some modifications and changes to the present invention should fall within the scope of protection of the claims of the present invention.

What is claimed is:

1. A side holding structure, characterized in that the side holding structure comprises:

side openings arranged on two opposite sides of a housing of a thermal transfer printing device, wherein a plurality of snap joints are arranged on edges of the side openings;

holding covers assembled in the side openings, wherein the holding covers comprise a ring mouth portion and a cover wall of a holding groove that is connected to a rear side of the ring mouth portion and concave inward, a plurality of hooks detachably connected to the plurality of snap joints are arranged on an inner side of the ring mouth portion, at least one positioning groove is arranged on a top outside of the cover wall;

at least one inserting portion arranged on a top cover of a top side of the housing and fitted to the positioning groove, wherein the inserting portion is detachably inserted into the positioning groove.

2. The side holding structure according to claim 1, characterized in that, a step portion is arranged on outer ring edges of the side openings, the ring mouth portion is fitted to the step portion, and a hook avoidance opening is arranged on the step portion.

3. The side holding structure according to claim 1, characterized in that more than two sets of positioning grooves and more than two sets of inserting portions are arranged.

4. The side holding structure according to claim 1, characterized in that an underside of the cover wall is uptilt along the inner side of the cover wall from the opening of the cover wall.

5. The side holding structure according to claim 1, characterized in that a linear structure is arranged on an inner surface of the cover wall.

6. The side holding structure according to claim 1, characterized in that the top cover is detachably connected to the top side of the housing by snap-on structures.

7. A thermal transfer printing device, characterized in that the thermal transfer printing device comprises:

a base frame;

a housing, mounted on the base frame, wherein side openings are arranged on opposite sides of the housing, and a plurality of snap joints are arranged on edges of the side openings;

holding covers, comprising a ring mouth portion and a cover wall of a grip groove that is connected to a rear side of the ring mouth portion and concave inward, a plurality of hooks detachably connected to the plurality of snap joints arranged on an inner side of the ring mouth portion, and at least one positioning groove arranged on a top outside of the cover wall;

a top cover, detachably connected to a top side of the housing, wherein at least one inserting portion fitted to the positioning groove is arranged on the edge of the top cover, an inserting mouth for the inserting portion to pass through is arranged on the top side of the housing, and the inserting portion is detachably inserted into the positioning groove through the inserting mouth;

a hot plate assembly, mounted on an underside of the base frame, generates heat required for thermal transfer printing when energized.

8. The thermal transfer printing device according to claim 7, characterized in that a cover ring is mounted on an upper end of the housing, and a sinking platform is arranged on an inner edge of the cover ring.

9. The thermal transfer printing device according to claim 8, characterized in that the top cover is detachably connected to the housing by snap-on structures.

10. The thermal transfer printing device according to claim 9, characterized in that a concave area is arranged in a middle part of the housing, two ends of the handle bases are arranged in the concave area, an avoidance opening facing to the concave area, and a handle top covering upper sides of the handle bases is arranged in a middle part of the top cover; the snap-on structures comprise a first snap-on structure arranged between an edge of the top cover and a top edge of the housing, a second snap-on structure between an edge of the avoidance opening and an edge of the concave area, and a third snap-on structure between a top of the handle and the handle base.

* * * * *